(12) United States Patent
Nishiwaki

(10) Patent No.: US 6,239,914 B1
(45) Date of Patent: May 29, 2001

(54) METHOD OF MANUFACTURING NOZZLE MEMBER, AND WORK APPARATUS

(75) Inventor: Masayuki Nishiwaki, Soka (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/305,201

(22) Filed: May 5, 1999

Related U.S. Application Data

(62) Division of application No. 08/870,726, filed on Jun. 6, 1997.

(30) Foreign Application Priority Data

Jun. 7, 1996 (JP) .................................................. 8-168332

(51) Int. Cl.$^7$ .................................................. G02B 27/10
(52) U.S. Cl. .................. 359/620; 359/619; 219/121.7; 219/121.71; 219/121.77; 29/890.1; 362/268
(58) Field of Search .................................... 359/619, 620, 359/621; 219/121.7, 121.71, 121.73, 121.74, 121.77; 29/890.1; 347/47; 362/268

(56) References Cited

U.S. PATENT DOCUMENTS 5,153,773   10/1992   Muraki et al. ........................ 359/619
5,263,250   11/1993   Nishiwaki et al. .................. 29/890.1
5,517,000    5/1996   Nishiwaki et al. ............. 219/121.77
5,674,414   10/1997   Schweizer ....................... 219/121.77
5,676,866   10/1997   in den Bäumen .............. 219/121.77
5,841,101   11/1998   Nishiwaki ....................... 219/121.71
6,008,468 * 12/1999   Tanaka et al. ................... 219/121.71

FOREIGN PATENT DOCUMENTS 0 454 152   10/1991   (EP) .
0 660 158    6/1995   (EP) .
0 719 644    7/1996   (EP) .
0 720 035    7/1996   (EP) .

* cited by examiner

Primary Examiner—Loha Ben
(74) Attorney, Agent, or Firm—Fitzpatrick, Cella, Harper & Scinto

(57) ABSTRACT

An ink jet printer comprises a nozzle member manufactured by a method including the step of splitting light from a light source by amplitude splitting to form a plurality of illumination beams, and the step of illuminating a plurality of mask patterns formed on a mask with corresponding split illumination beams so as to expose a workpiece via the mask patterns.

21 Claims, 8 Drawing Sheets

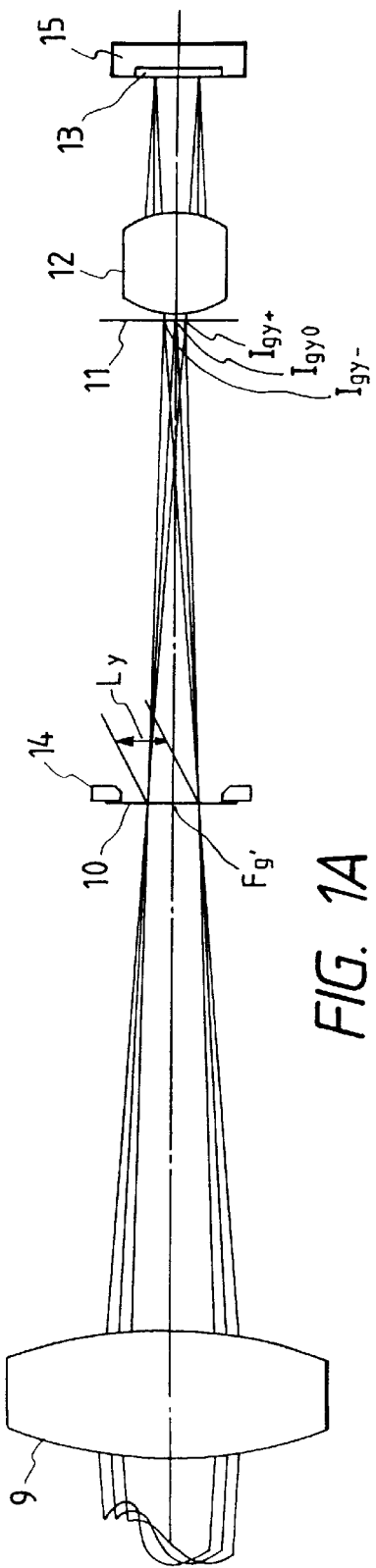
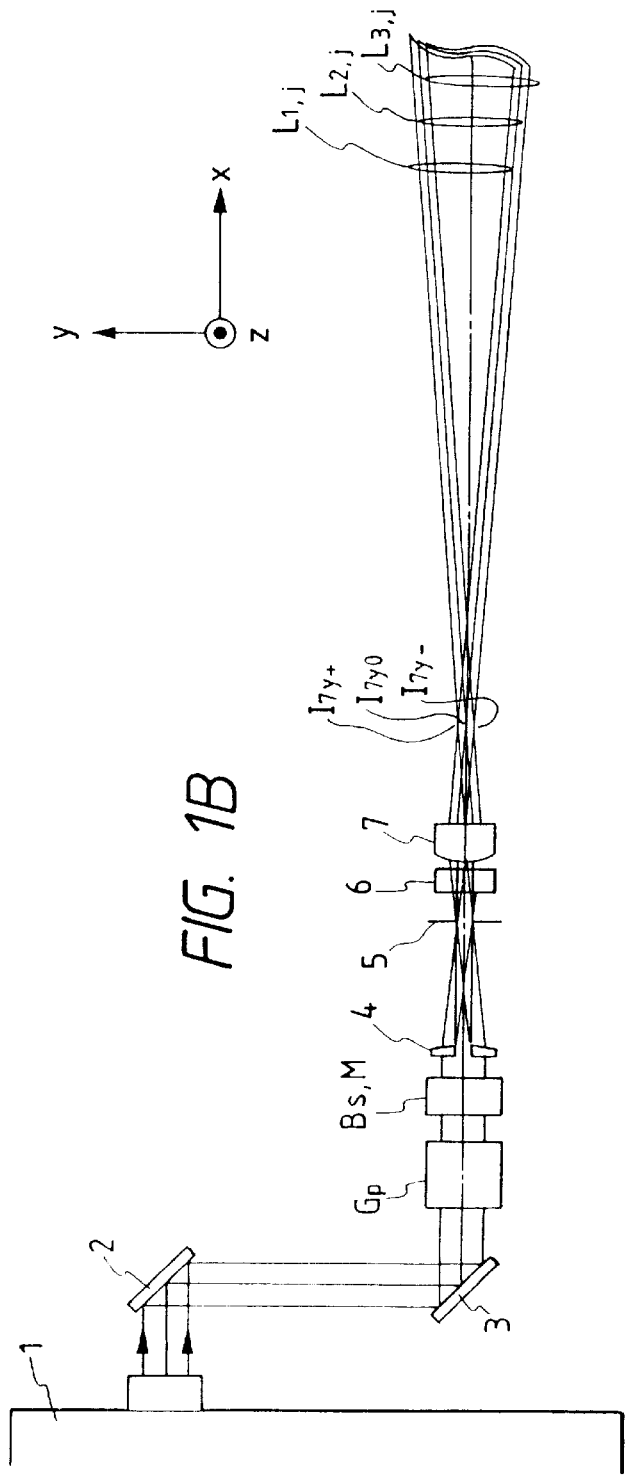
FIG. 1A
FIG. 1B

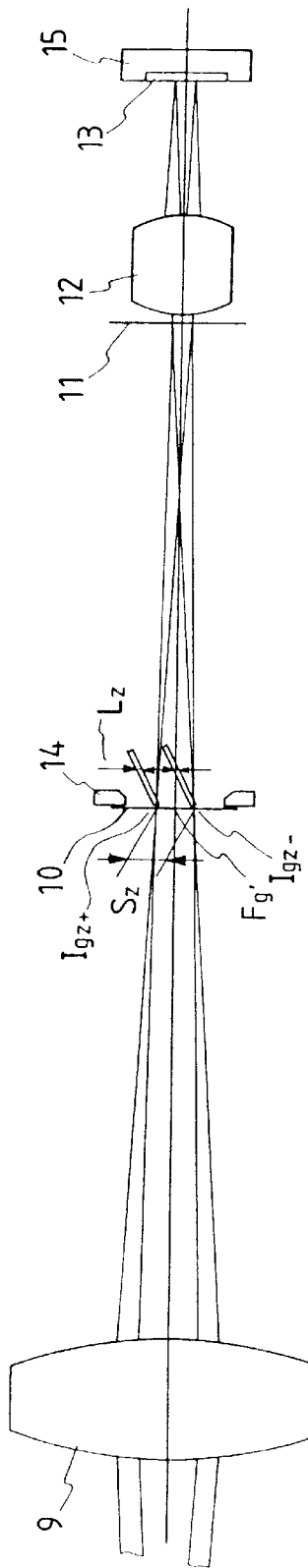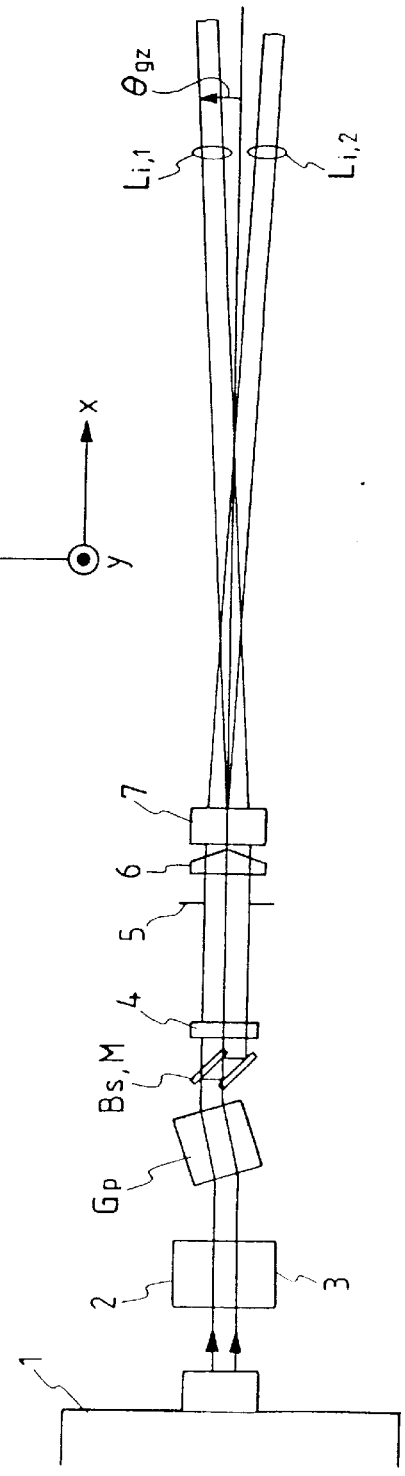
FIG. 2A
FIG. 2B

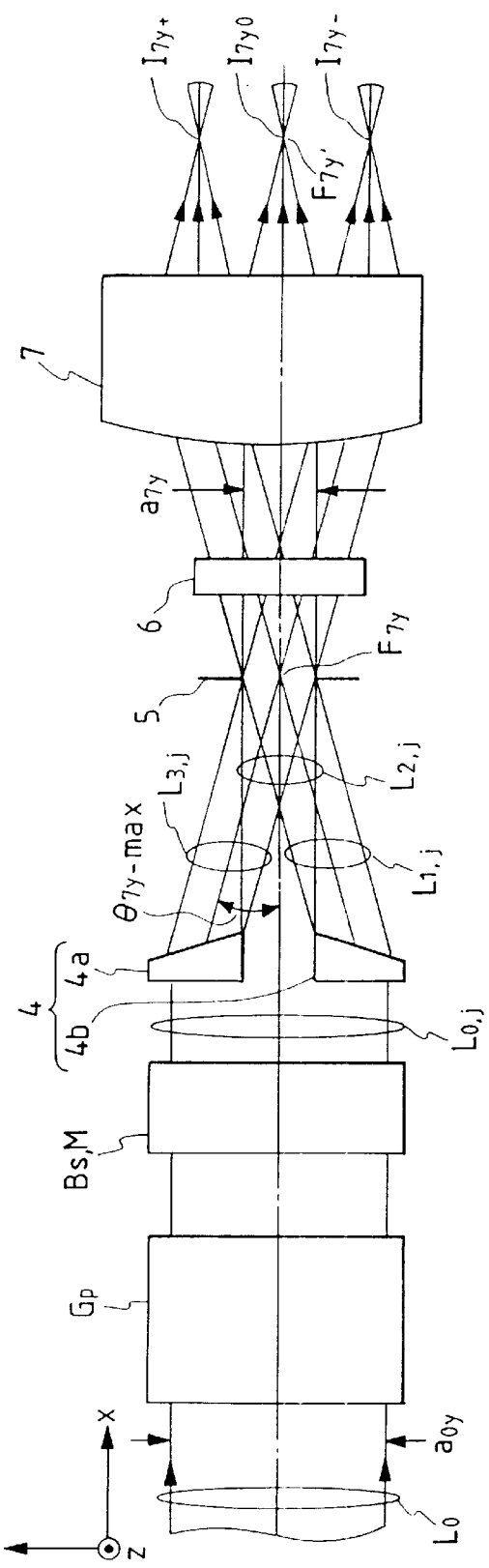
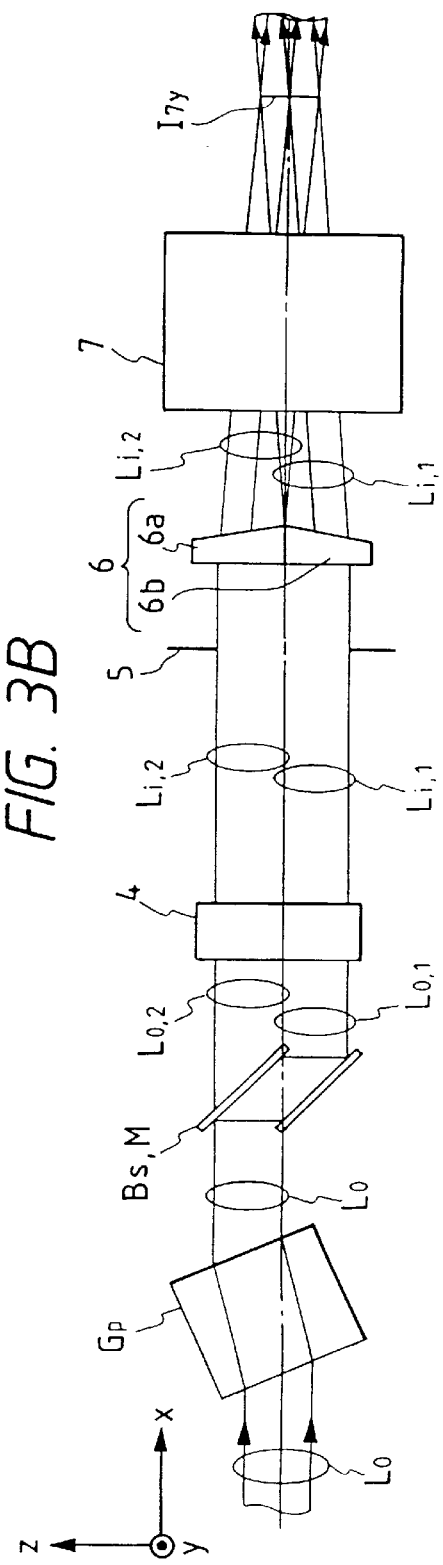
FIG. 3A
FIG. 3B

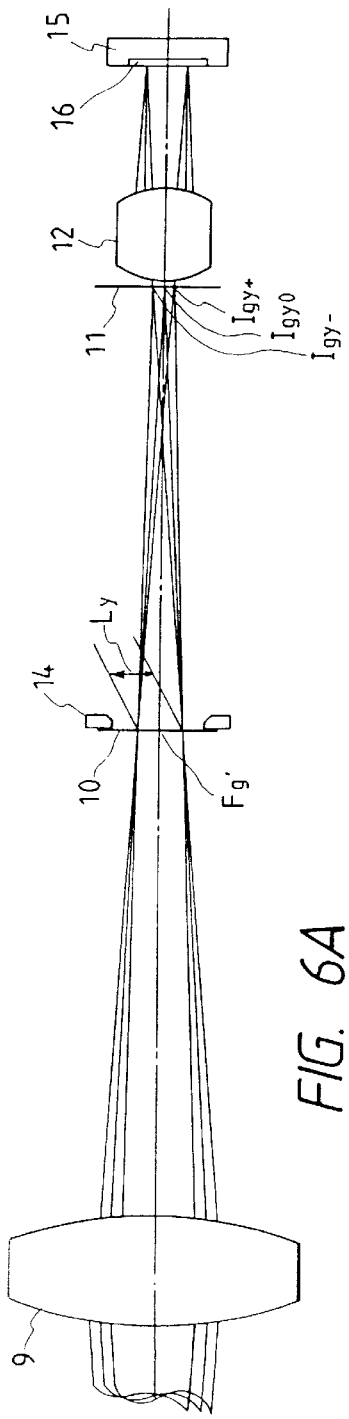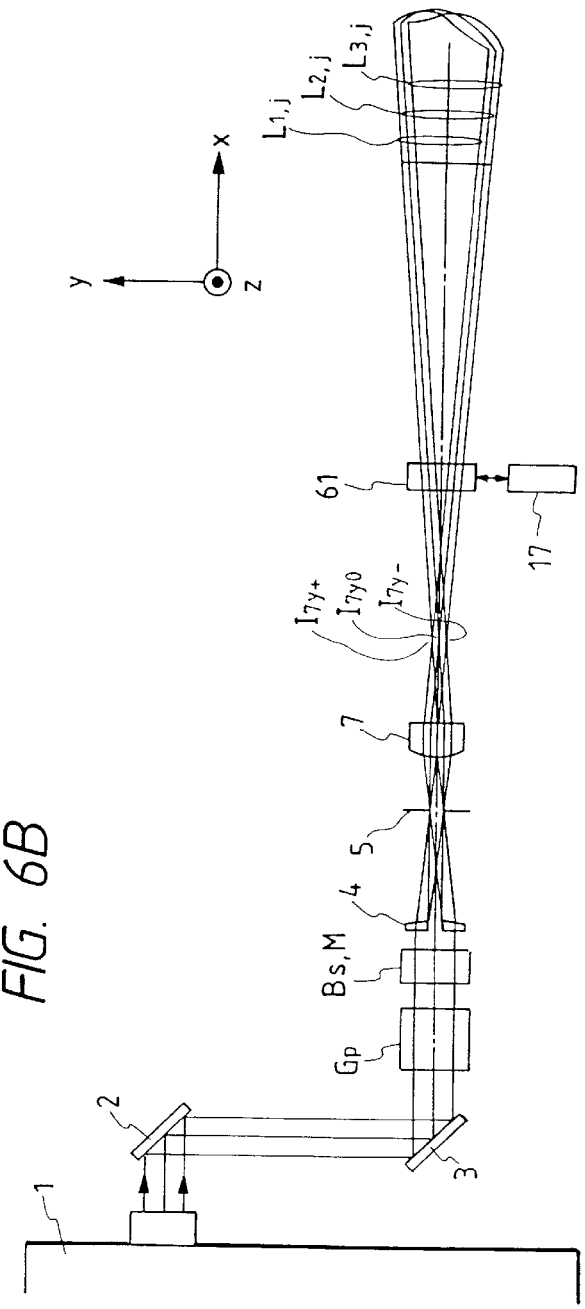
FIG. 6A
FIG. 6B

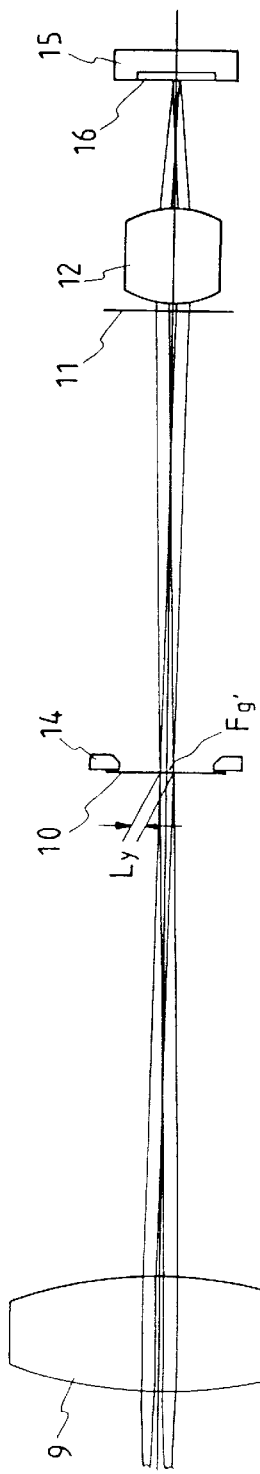
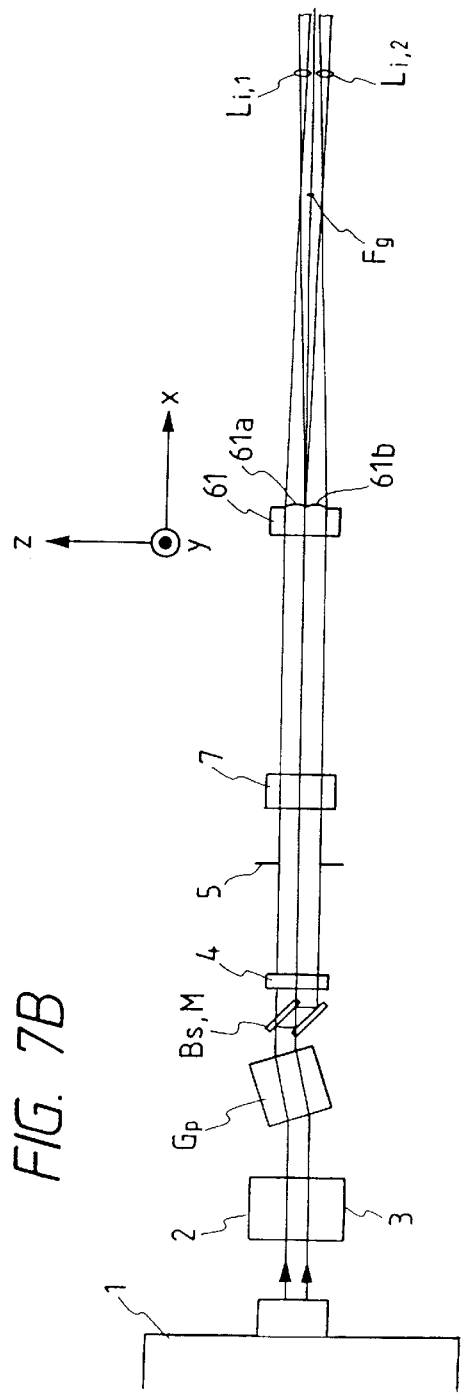
FIG. 7A
FIG. 7B

METHOD OF MANUFACTURING NOZZLE MEMBER, AND WORK APPARATUS

This is a divisional application of application Ser. No. 08/870,726, filed Jun. 6, 1997.

BACKGROUND OF THE INVENTION

1. Field of the Invention

The present invention relates to a method of manufacturing a nozzle member and a work apparatus, and is suitable for projecting a mask pattern formed on a mask onto a predetermined surface by uniformly and efficiently illuminating the mask surface with linear stripe-shaped illumination light, e.g., for the manufacturing method and work apparatus upon manufacturing a nozzle member to be used in an ink-jet printer.

2. Related Background Art

In recent years, precision parts have been popularly manufactured by a mask projection method. In the mask projection method, a laser is used as a light source, and a pattern on a mask illuminated by the laser beam is projected onto the surface to be worked via a projection lens, thereby precisely working a workpiece by means of optical energy.

As one part that is suitable for laser work based on the mask projection method, an orifice forming work of an orifice plate (nozzle member) of a bubble-jet printer (to be referred to as an ink-jet printer hereinafter) is known. In general, an ink-jet printer is of the type that prints characters and figures by intermittently ejecting ink from an array of a large number of small orifices each having a diameter of 20 $\mu$m to 50 $\mu$m onto the sheet surface, and the orifice plate is a member having the large number of small orifices (nozzles) for ejecting ink. In order to improve the quality of characters to be printed, it is important to precisely control the ink ejection timings and to manufacture the large number of small orifices on the orifice plate with high precision.

Such a mask projection method is required to have especially high productivity and to assure stable, high-precision work.

SUMMARY OF THE INVENTION

It is an object of the present invention to provide a method of manufacturing a nozzle member and a work apparatus with high production efficiency.

A method of manufacturing a nozzle member according to the present invention is characterized by the step of splitting light from a light source by amplitude splitting to form a plurality of illumination beams, and the step of illuminating a plurality of mask patterns formed on a mask with corresponding ones of the plurality of illumination beams so as to expose a workpiece via the mask patterns.

Especially, each of the mask patterns has a pattern formed by arranging a plurality of small openings corresponding to nozzle orifices of a nozzle member in a first direction.

The illumination beams are condensed on a plurality of linear illumination regions extending in the first direction at a position of the mask.

The plurality of mask patterns are formed parallel to each other along a second direction perpendicular to the first direction.

The plurality of mask patterns are formed on a common substrate.

The step of splitting the light from the light source includes splitting the light from the light source into n (n$\geq$2) illumination beams $L_{0,1}$ to $L_{0,n}$ which are substantially parallel to each other, by amplitude splitting in a second section including an optical axis, splitting each light beam $L_{0,j}$ (for j=1 to n) into m (m$\geq$2) illumination beams $L_{1,j}$ to $L_{m,j}$ and directing the illumination beams $L_{1,j}$ to $L_{m,j}$ in different directions to cross each other at a first position in a first section which includes the optical axis and is perpendicular to the second section, and directing illumination beams $L_{i,1}$ to $L_{i,n}$ (for i=1 to m) that cross each other at the first position in different directions to cross each other at a second position in the second section so as to form a plurality of illumination beams $L_{i,1}$ to $L_{m,n}$, or further splitting each of the illumination beams $L_{i,1}$ to $L_{i,n}$ (for i=1 to m) that cross each other at the first position into q illumination beams Laws to $L_{i,j,1}$ to $L_{i,j,q}$ and directing the split illumination beams in different directions to cross each other at the second position so as to form a plurality of illumination beams $L_{1,1,1}$ to $L_{m,n,q}$.

The light beams that pass through the plurality of mask patterns illuminate different positions on a common workpiece.

The light beams that pass through the plurality of mask patterns illuminate different workpieces.

The plurality of illumination beams are directed toward the plurality of mask patterns via a common optical system.

The illumination beams that pass through the plurality of mask patterns are directed onto the workpiece via a projection optical system to form images on the plurality of mask patterns on the workpiece.

The light source comprises a laser.

The light source comprises an excimer laser.

A method of manufacturing an ink-jet printer according to the present invention is characterized by the step of manufacturing a nozzle member by the above-mentioned method of manufacturing a nozzle member and the like.

An ink-jet printer according to the present invention is characterized by comprising a nozzle member manufactured by the above-mentioned method of manufacturing a nozzle member and the like.

A work apparatus according to the present invention is characterized by manufacturing a nozzle member by the above-mentioned method.

The apparatus comprises beam splitting means for splitting light from a light source into n (n$\geq$2) illumination beams $L_{0,1}$ to $L_{0,n}$ by amplitude splitting in a second section including an optical axis, a first optical member for splitting each light beam $L_{0,j}$ (for j=1 to n) into m (m$\geq$2) illumination beams $L_{1,j}$ to $L_{m,j}$ and directing the illumination beams $L_{1,j}$ to $L_{m,j}$ in different directions to cross each other at a first position in a first section which includes the optical axis and is perpendicular to the second section, a second optical member for forming a plurality of illumination beams $L_{1,1,1}$ to $L_{m,n,q}$ by directing illumination beams $L_{i,1}$ to $L_{i,n}$ (for i=1 to m) that cross each other at the first position in different directions to cross each other at a second position in the second section or by further splitting each of the illumination beams $L_{i,1}$ to $L_{i,n}$ (for i=1 to m) that cross each other at the first position into q illumination beams $L_{i,j,1}$ to $L_{i,j,q}$ and directing the split illumination beams in different directions to cross each other at the second position, and an anamorphic optical system for forming a linear illumination region corresponding to one mask pattern on a mask by making a plurality of illumination beams $L_{1,j}$ to $L_{m,j}$ or $L_{1,j,k}$ to $L_{m,j,k}$ (for j=1 to n, k=1 to q) coming from the second optical member overlap each other on the mask.

The beam splitting means comprises a beam splitter and a reflection mirror.

The apparatus further comprises beam adjustment means, inserted between the light source and the beam splitting means, for adjusting a position of light from the light source in the second section.

The first optical member comprises a plurality of prisms.

The second optical member comprises a plurality of prisms.

The second position and a position of an entrance pupil of the projection optical system have an optically conjugate positional relationship therebetween.

The optical system comprises an anamorphic lens having different refractive powers in the first and second sections, and a lens system having mutually equal refractive powers in the first and second sections.

The anamorphic lens focuses the plurality of illumination beams $L_{1,1}$ to $L_{m,n}$ or $L_{1,1,1}$ to $L_{m,n,q}$ on a plane, which is located at the second position and is perpendicular to the optical axis, in the first section, and the lens system makes a plurality of illumination beams $L_{1,j}$ to $L_{m,j}$ or $L_{1,j,k}$ to $L_{m,j,k}$ (for j=1 to n, k=1 to q) coming from the plane overlap each other on the mask and focuses the illumination beams on the mask in the second section.

The anamorphic lens comprises at least one cylindrical lens.

The rear focal point in the first section of the anamorphic lens is located at the second position.

The front focal point in the first section of the anamorphic lens is located at the first position.

The light source comprises a laser, preferably on excimer laser.

A method of manufacturing a nozzle member is characterized in that (i) a light source, (ii) a first optical member for splitting a light beam from the light source in a first section including an optical axis, (iii) an anamorphic lens having a refractive power in only the first section, (iv) a second optical member for splitting incident light beams in a second section which includes the optical axis and is perpendicular to the first section, and imaging the split light beams in the second section, (v) a focusing optical system having a front focal point located at an imaging point of the second optical member, (vi) a mask which has a mask pattern formed by arranging a plurality of small openings corresponding to nozzle orifices of a nozzle member in a first direction perpendicular to the optical axis in the first section, and is set at a rear focal point of the focusing optical system, and (vii) a projection optical system for forming an image of the mask pattern on a workpiece are provided.

When the light beam from the light source is split into a plurality of light beams via the first and second optical members, a plurality of light beams split in the first section form intermediate images by the anamorphic lens and, thereafter, are imaged in an entrance pupil of the projection optical system via the focusing optical system, a plurality of light beams split in the second section illuminate the mask pattern via the focusing optical system, and the projection optical system forms an image of the mask pattern illuminated with the plurality of light beams on the workpiece.

The plurality of split light beams overlap each other on the mask in the first and second sections.

The second optical member comprises a cylindrical lens array built by arranging a plurality of cylindrical lenses, each of which has a generator in the first direction, in a second direction perpendicular to the optical axis in the second section.

A focal length $f_{61z}$ of the cylindrical lens satisfies:

$$f_{61z} \leq \frac{f_9}{L_{z0}} * \frac{a_{61z}}{u}$$

( * indicates multiplication. The same applies to the following description.)

where $L_{z0}$ is the width, in the second direction, of the mask pattern, $f_9$ is the focal length of the focusing optical system, u is the number of beams split by the second optical member, and $a_{61z}$ is the width, in the second direction, of a light beam that enters the second optical member.

A diameter $A_{11}$ of the entrance pupil satisfies:

$$\frac{L_{z0}}{2} + s * \left(\frac{1}{2} - \frac{1}{2u}\right) * \frac{a_{61z}}{f_9} < \frac{A_{11}}{2}$$

where s is the distance from the mask to the entrance pupil of the projection optical system.

The second optical member is retreated from an optical path or is replaced by another optical element in correspondence with a pattern shape and/or a pattern size of the mask pattern.

Light from the light source is split into n (n≧2) illumination beams $L_{0,1}$ to $L_{0,n}$, which are substantially parallel to each other, by amplitude splitting by beam splitting means in the second section, each light beam $L_{0,j}$ (for j=1 to n) is split into m (m≧2) illumination beams $L_{1,j}$ to $L_{m,j}$ and the illumination beams $L_{1,j}$ to $L_{m,j}$ are directed in different directions to cross each other at a first position by the first optical member in the first section, the illumination beams $L_{1,j}$ to $L_{m,j}$ enter the anamorphic lens, and the second optical member splits the illumination beams into u light beams in units of illumination beams $L_{i,1}$ to $L_{i,n}$ (for i=1 to m) in the second section.

The beam splitting means comprises a beam splitter and a reflection mirror.

Beam adjustment means for adjusting a position of light from the light source in the second section is inserted between the light source and the beam splitting means.

The light source comprises an excimer laser.

A method of manufacturing an ink-jet printer, an ink-jet printer itself, and a work apparatus according to the present invention are characterized by the step of manufacturing a nozzle member by the above-mentioned method, or by comprising a nozzle member.

BRIEF DESCRIPTION OF THE DRAWINGS

FIGS. 1A and 1B are schematic plan views showing a principal part of the first embodiment of a method of manufacturing a nozzle member and a work apparatus using the method according to the present invention;

FIGS. 2A and 2B are schematic side views showing a principal part of the first embodiment;

FIGS. 3A and 3B are respectively a plan view and a side view showing the individual members from a parallel-plate glass to a first cylindrical lens 7 in detail;

FIGS. 6A and 6B are schematic plan views showing a principal part of the second embodiment of a method of manufacturing a nozzle member and a work apparatus using the method according to the present invention;

FIGS. 7A and 7B are schematic side views showing a principal part of the second embodiment;

DETAILED DESCRIPTION OF THE PREFERRED EMBODIMENTS

Figure 4:
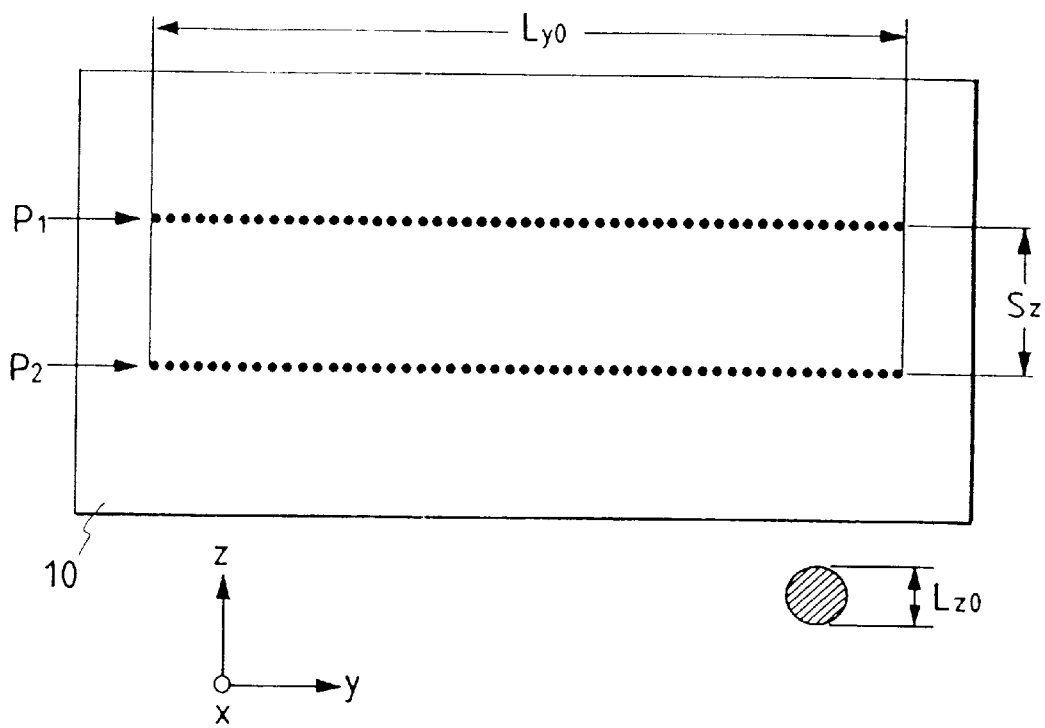
FIG. 4 is a front view of a mask of the first embodiment.

FIGS. 1A and 1B are schematic plan views showing a principal part of the first embodiment of a method of manufacturing a nozzle member and a work apparatus using the method according to the present invention, and FIGS. 2A and 2B are schematic side views showing a principal part of the first embodiment of the present invention. For the sake of simplicity, an xyz coordinate system is defined to have the optical axis of an optical system (the optical axis of a projection lens 12 (to be described later) is assumed to be the "optical axis of the optical system") as an x-axis, a horizontal surface as an x-y plane, and a side surface as an x-z plane. The y-axis direction is defined as a first direction, the z-axis direction is defined as a second direction, the x-y plane is defined as a first plane or a first section, and the x-z plane is defined as a second plane or a second section.

Referring to FIGS. 1A and 1B, a light source 1 uses a laser such as a KrF excimer laser or the like. Return mirrors 2 and 3 adjust the propagation direction of a laser beam emitted by the light source 1. A parallel-plate glass $G_P$ is rotatable about a rotation axis parallel to the y-axis, and shifts an incident light beam in the z-direction in the x-z plane. A beam splitter $B_S$ amplitude-splits an incident light beam into a transmitted light beam and a reflected light beam. A reflection mirror M reflects the light beam reflected by the beam splitter $B_S$ to direct it in an optical path nearly parallel to that of the transmitted light beam. Note that the reflection mirror M is rotatable about a rotation axis parallel to the y-axis to change its tilt angle, and its z-direction position can also be changed. The parallel-plate glass $G_P$ and the like form a light beam adjustment means, and the beam splitter $B_S$, reflection mirror M, and the like a light beam splitting means.

A y-direction beam splitting means (first optical member) 4 is constituted by separately setting a pair of prisms 4a and 4b having mutually equal vertex angles, and wavefront-splits a laser beam into three illumination beams having different propagation directions in the x-y plane. A light-shielding mask 5 has an aperture formed at its center. A z-direction beam splitting means (second optical member) 6 is constituted by separately setting a pair of prisms 6a and 6b having equal vertex angles, and splits a laser beam into two illumination beams having different propagation directions in the x-z plane. A first cylindrical lens (anamorphic lens) 7 has a focusing effect in the x-y plane alone. A convex lens (lens system) 9 constitutes a focusing optical system, and normally comprises a rotary-symmetrical lens having the same refractive powers (1/focal length), i.e., the same focusing effects, in the x-y and x-z planes.

A mask 10 has a pattern formation surface serving as the surface to be illuminated by illumination beams. The position of the mask 10 nearly matches a rear focal point $F_0'$ of the convex lens 9. A projection lens (projection optical system) 12 has an entrance pupil 11 (a stop sometimes serves as an entrance pupil). An object to be worked (workpiece) 13 is worked as an orifice plate (nozzle member) of an ink-jet printer in the case of this embodiment. The mask 10 is held by a holding member 14, and the workpiece 13 is held by a holding member 15 (means for holding first and second substrates to be exposed). The projection lens 12 projects an image of a pattern (a plurality of mask patterns) on the mask 10 onto the surface of the workpiece 13.

FIGS. 3A and 3B show the individual members from the parallel-plate glass $G_P$ to the first cylindrical lens 7 in detail. FIG. 3A is a plan view, and FIG. 3B is a side view.

FIG. 4 is a front view of the mask 10 of this embodiment. The pattern on the mask 10 is formed by regularly forming transparent small holes (apertures) along two straight lines parallel to the y-axis on an opaque background portion, the total length in the y-direction is $L_{y0}$, the width of each small hole is $L_{z0}$, and the interval between the small hole arrays is $S_z$. The mask 10 is prepared by forming a metal film (background portion) of, e.g., chromium on a transparent substrate, and forming a pattern (small hole arrays) by patterning. This pattern corresponds to the ink ejection orifices (nozzle orifices) of a nozzle member.

The pattern on the mask of this embodiment has a layout in which two parallel individual patterns (mask patterns) $P_i$ consisting of small hole arrays each formed within a range which is long in the first direction and is narrow in the second direction (an area $L_{y0} \times L_{z0}$: subscripts y and z respectively indicate components in the y- and z-directions) are set to be separated by the interval $S_z$. That is, the two parallel mask patterns are arranged along the second direction. In this embodiment, an individual pattern $P_1$ will be referred to as a first mask pattern hereinafter, and an individual pattern $P_2$ will be referred to as a second mask pattern hereinafter. In this embodiment, the pair of mask patterns on the mask 10 are projected onto the object to be worked (a pair of workpieces) 13, thereby forming a large number of small holes each having a diameter of 20 μm to 50 μm at two positions on a single object to be worked or on two objects to be worked within the range of a length of about 10 mm.

If the projection magnification of the projection lens 12 is ⅕, each mask pattern is the one on which transparent small holes each having a diameter $L_{z0}=0.1$ to 0.25 nm over the range of $L_{y0}=50$ mm is formed.

The longitudinal direction (y-direction) of the mask agrees with all the beam splitting directions of the y-direction beam splitting means 4, and the mask 10 is attached to the mask holding member 14, so that its center matches the x-axis.

Note that the first cylindrical lens 7 and the convex lens 9 form an anamorphic optical system. The effect of this embodiment will be explained below. Since this embodiment provides different optical effects in the x-y and x-z planes, two effects will be described in turn below.

The effect in the x-y plane (first section) will be described below with reference to FIGS. 1A and 1B and FIG. 3A. A laser beam which is emitted from the light source in the optical axis direction (x-direction) is a light beam which has a larger width in the y-direction than that in the z-direction in a section perpendicular to the optical axis. This light beam is reflected by the return mirrors 2 and 3, and enters the parallel-plate glass $G_P$ along an optical path parallel to the x-axis while the longitudinal direction of the light beam agrees with the y-axis as the longitudinal direction of the mask.

The parallel-plate glass $G_P$, the beam splitter $B_S$, and the reflection mirror M have no convergence/divergence effects. Since a light beam $L_0$ originating from the light source is split into two illumination light beams $L_{0,1}$ and $L_{0,2}$ in the x-z plane by the beam splitter $B_S$ and the reflection mirror M, the light beams that enter the y-direction beam splitting means 4 are written as $L_{o,j}$ (j=1, 2).

The y-direction beam splitting means 4 is constituted by arranging the two prisms 4a and 4b to be spacingly separated in the y-direction, as shown in FIG. 3A, and splits the incident light beams $L_{0,j}$ into three illumination beams $L_{1,j}$, $L_{2,j}$, and $L_{3,j}$ having different propagation directions in the x-y plane.

The central light rays of the three-split illumination beams $L_{1,j}$, $L_{2,j}$, and $L_{3,j}$ cross at one point $F_{7y}$ (first position) on the optical axis, and the light-shielding mask 5 is disposed at this position $F_{7y}$. The light-shielding mask 5 has a rectangular aperture at its center, which shapes the three split illumination beams to have equal widths in the y-direction, and removes stray light produced before the y-direction beam splitting means 4.

The setting position $F_{7y}$ of the light-shielding mask 5 corresponds to the front focal point of the first cylindrical lens 7 having a refractive power in the x-y section alone and, hence, the central light rays of the three illumination beams emerging from the first cylindrical lens 7 become parallel to the optical axis. That is, the mask 5 and the first cylindrical lens 7 construct a so-called telecentric optical system. Note that the three illumination beams are transmitted through the z-direction beam splitting means 6 before they enter the first cylindrical lens 7, but they undergo only an optical effect of the z-direction beam splitting means 6 serving as a parallel plate in the x-y plane. (However, in practice, the two illumination beams $L_{i,1}$ and $L_{i,2}$ are deflected in the x-z plane, as will be described later.) The three illumination beams $L_{1,j}$, $L_{2,j}$, and $L_{3,j}$ are brought into a focus at a rear focal point position $F_{7y}'$ (second position, first focal plane) on the image field side after they are transmitted through the first cylindrical lens 7, thus forming three images (intermediate images in the x-y plane) $I_{7y}$, $I_{7y0}$, and $I_{7y-}$. Note that these images are linear images parallel to the z-axis in practice since the light beams diverge in the x-z plane.

Figure 5:
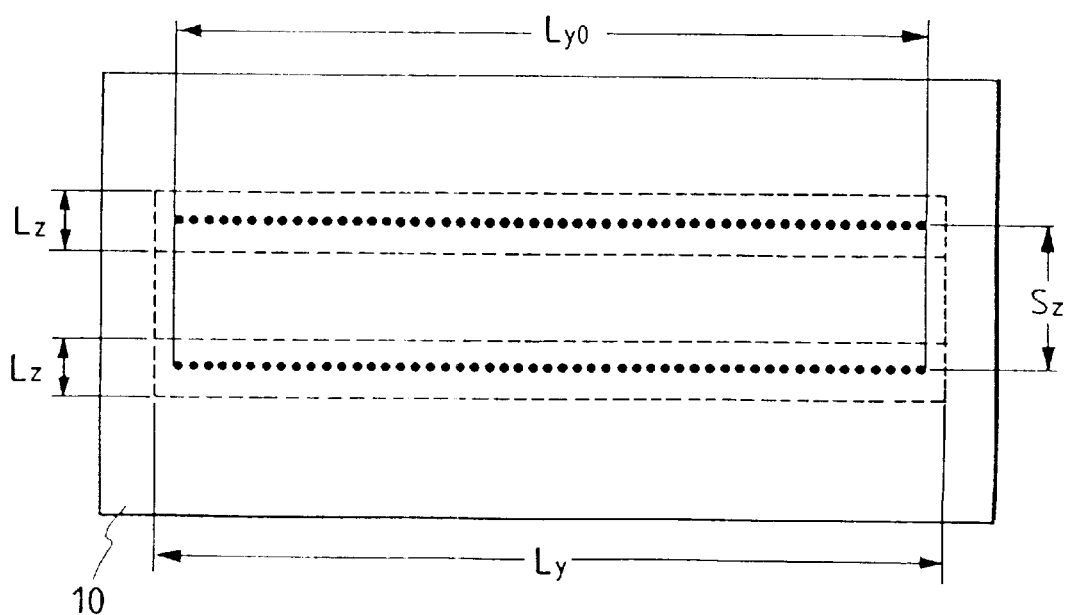
FIG. 5 is an explanatory view of the illumination range of a mask pattern of the first embodiment.

Subsequently, the convex lens 9 re-images the three linear images $I_{7y}$, $I_{7y0}$, and $I_{7y}$ on the entrance pupil plane 11 of the projection lens 12 as images $I_{9y+}$, $I_{9y0}$, and $I_{9y}$. At this time, since the position of the mask 10 corresponds to a rear focal point $F_9'$ of the convex lens 9, all the three illumination beams overlap each other in the x-y plane but are defocused. Note that $L_y$ represents the length of the light beam (the length of the illumination region) at the overlapping position. The length $L_y$ is assured to sufficiently cover the length $L_{y0}$, in the y-direction, of the mask patterns $P_1$ and $P_2$, as shown in FIG. 5.

The projection lens 12 re-images the mask patterns on the mask 10 on the workpiece 13. In this case, if the entrance pupil 11 is set at the position of the front focal point of the projection lens 12, the chief rays of the illumination beams exit the projection lens 12 in a direction parallel to the optical axis.

With this arrangement, in this embodiment, the light beam from the laser light source is split into the three illumination beams $L_{1,j}$, $L_{2,j}$, and $L_{3,j}$ in the x-y plane, and these three illumination beams are brought into a focus to form the linear images $I_{7y+}$, $I_{7y0}$, and $I_{7y-}$. Subsequently, these three images $I_{7y+}$, $I_{7y0}$, and $I_{7y-}$ are re-imaged in the entrance pupil 11 of the projection lens 12 as the images $I_{9y+}$, $I_{9y0}$, and $I_{9y-}$. In addition, Köhler illumination is realized to uniformly illuminate the entire mask 10 in the y-direction.

Note that the focal length $f_{7y}$ of the first cylindrical lens 7 is determined by the diameter $a_{7y}$, in the y-direction, of the illumination beam $L_i$ that enters the lens 7, the focal length $f_9$ of the convex lens 9, and the length $L_y$ of the illumination region of the mask 10. That is, if $m_{9y}$ represents the imaging magnification when the convex lens 9 images the linear images $I_{7y+}$, $I_{7y0}$, and $I_{7y-}$, formed by the first cylindrical lens 7 on the entrance pupil 11, and bgy represents the distance from the rear principal plane of the convex lens 9 to the entrance pupil 11 of the projection lens 12, the focal length $f_{7y}$ of the first cylindrical lens 7 is given by:

$$f_{7y}=a_{7y}*\{(b_{9y}-f_9)/L_y\}*|1/m_{9y}| \quad (1).$$

Normally, if $a_{oy}$ represents the width, in the y-direction, of a laser beam immediately after it is emitted by an excimer laser, and m represents the number of beams split by the y-direction beam splitting means 4, $a_{7y}=a_{0y}/m$. Using these relationships, the individual parameters can be calculated from the range to be illuminated in practice.

The illumination region $L_y$ of the mask 10 preferably falls within the range from a length nearly equal to the length $L_{yo}$, in the y-direction, of the mask patterns $P_1$ and $P_2$ to a length larger by about 20%, i.e.:

$$L_{yo} \leq L_y \leq 1.2*L_{yo} \quad (2).$$

To attain such range, the focal length $f_{7y}$ of the first cylindrical lens 7 is determined while setting $a_{7y}$ as the entrance width of the illumination beam $L_i$ into the first cylindrical lens 7 to fall within the range from $a_{7y}$ to ($a_{7y}/1.2$), and in practice, an illumination beam having the width $a_{7y}$ need only be sent to enter the lens 7. That is, $f_{7y}$ can be determined by the following equation:

$$f_{7y}=k*a_{7y}*\{(b_{9y}-f_9)/L_{y0}\}*|1/m_{9y}| \quad (3)$$

for k=1 to 1/1.2.

From this result, the condition for the two prisms 4a and 4b that build the y-direction beam splitting means 4 is then calculated. The exit angle from the y-direction beam splitting means 4 is determined by the focal length $f_{7y}$ of the first cylindrical lens 7, the diameter $A_{11}$ of the entrance pupil 11 (the aperture of the stop) of the projection lens 12, and the imaging magnification $m_{9y}$, in the y-direction, of the convex lens 9.

That is, in order to form the above-mentioned three linear images $I_{7y+}$, $I_{7y0}$, and $I_{7y-}$ in the entrance pupil 11, the following condition must be met:

$$\tan(\theta_{7y-max}) \leq (A_{11}/2)/(f_{7y}*m_{9y}) \quad (4)$$

where $\theta_{7y-max}$: the angle the illumination beam obliquely emerging from the y-direction beam splitting means makes with the optical axis (FIG. 3A).

The two prisms 4a and 4b may comprise prisms each of which gives $\theta_{7y-max}$ obtained by equation (4) above as the angle of deflection.

The effect in the x-y plane of this embodiment has been described. Note that the optical effect of the z-direction beam splitting means 6 must be taken into consideration upon determining the optical layout.

The effect in the x-z plane (second section) will be described below with reference to FIGS. 2A and 2B and FIG. 3B. As described above, the laser beam emitted from the light source 1 in the optical axis direction is a light beam of a sectional shape which has a larger width in the y-direction than that in the z-direction in a section perpendicular to the optical axis. This light beam is deflected by the return mirrors 2 and 3 and enters the parallel-plate glass $G_P$ along an optical path parallel to the x-axis, while its longitudinal direction agrees with the y-axis as the longitudinal direction of the mask.

The parallel-plate glass $G_P$ shifts the incident light beam in a direction parallel to the z-direction. The shifted light beam $L_0$ then enters the beam splitter $B_S$, and is split into a transmitted light beam $L_{0,2}$ and a reflected light beam $L_{0,1}$ by amplitude splitting. The reflected light beam $L_{0,1}$ is reflected again by the reflection mirror M and becomes a light beam nearly parallel to the optical axis. Then, the reflected light beam $L_{0,1}$ enters the y-direction beam splitting means 4 to propagate parallel to the transmitted light beam $L_{0,2}$.

In the x-z plane, the y-direction beam splitting means 4 merely has an effect of a parallel plate with respect to the incident light beams. However, since the light beams $L_{0,1}$ and $L_{0,2}$ pass through the y-direction beam splitting means 4 in the x-y plane and are split into the three illumination beams $L_{1,j}$, $L_{2,j}$, and $L_{3,j}$ (j=1, 2), as described above, they pass through the y-direction beam splitting means 4 and become light beams $L_{i,1}$ and $L_{i,2}$ (i=1, 2, 3) in FIG. 3B. Then, these light beams pass through the light-shielding mask 5 and enter the z-direction beam splitting means 6.

As shown in FIG. 3B, the z-direction beam splitting means 6 is built by juxtaposing the two prisms 6a and 6b having equal vertex angles in the z-direction, and changes the directions of the incident illumination beams $L_{i,1}$ and $L_{i,2}$ to cross each other in the x-z plane. These two illumination beams $L_{i,1}$ and $L_{i,2}$ undergo neither the convergence nor the divergence effects in the z-direction by the first cylindrical lens 7.

The central rays of the two collimated illumination beams $L_{i,1}$ and $L_{i,2}$ each consisting of three beams are transmitted through the first cylindrical lens 7, and cross each other at the rear focal point position $F_{7y}'$ of this lens. Subsequently, these two collimated illumination beams enter the convex lens 9, and are brought into a focus to form images $I_{9z+}$ and $I_{9z-}$ at the position of the mask 10 set at the rear focal point $F_9'$ of the convex lens 9 after they are transmitted through the lens 9. Since these images are enlarged to a length $L_y$ shown in FIG. 5 in the y-direction, they are linear images each having the length $L_y$. The interval between the two linear images $I_{9z+}$ and $I_{9z-}$ is $S_z$. The projection lens 12 images the plurality of mask patterns on the mask 10, which are illuminated to have a size nearly equal to a point in the z-direction, onto the workpiece 13.

In the above-mentioned effect in the x-z plane, the functions of the parallel-plate glass $G_P$ beam splitter $B_S$, and reflection mirror M as the feature of the present invention will be described in more detail below.

Before exposure of the workpiece, the position of the above-mentioned members is adjusted. First, the position of the parallel-plate glass $G_P$ is adjusted while observing the beam incident position at the z-direction beam splitting means 6. That is, the parallel-plate glass $G_P$ is rotated to shift the laser beam $L_o$ in the z-direction, so that all the light components of the light beam $L_{0,2}$, which is transmitted through the beam splitter $B_S$, enter and are refracted by the prism 6a, but do not enter the prism 6b at all.

Subsequently, the tilt angle and the position, in the z-direction, of the reflection mirror M are adjusted to make the light beam $L_{0,1}$ reflected by the beam splitter $B_S$ parallel to the transmitted light beam $L_{0,2}$, so that all the light components of the light beam $L_{0,1}$ enter and are refracted by the prism 6b, but do not enter the prism 6a at all.

In this manner, adjustment is made so that the transmitted light beam $L_{0,2}$ and the reflected light beam $L_{0,1}$ from the beam splitter $B_S$ respectively enter the prisms 6a and 6b of the z-direction beam splitting means 6 to have a one-to-one correspondence therebetween. Since light beams that enter the prisms are always parallel to the optical axis, the angles the light beams leaving the individual prisms make with the optical axis have equal absolute values.

Note that the two light beams emerging from the individual prisms at that time do not always have equal intensities although they preferably have equal intensities. No problem is posed if they have equal intensities. For this reason, in some cases, an attenuation filter or the like is inserted into the optical path of the light beam having a higher intensity to adjust the intensities, so that the two light beams have equal intensities.

In this manner, the adjustment of the parallel-plate glass $G_P$, the beam splitter $B_S$ as an amplitude splitter, and the reflection mirror M is completed, and work of the workpiece 13 is started.

As described above, the parallel-plate glass G, beam splitter $B_S$, and reflection mirror M have a function of amplitude-splitting the light beam from the light source to double the split beams in the z-direction, and a function of making adjustment so that light beams appropriately enter the z-direction beam splitting means 6.

The vertex angles of the prisms 6a and 6b that make up the z-direction beam splitting means 6 are determined on the basis of the following relationship. That is, since the angle of deflection of each of the prisms 6a and 6b directly becomes an incident angle $\theta_{9z}$ (FIGS. 2A and 2B) of a collimated light beam to the convex lens 9, the following relation is obtained:

$$\tan\theta_{9z}=(S_z/2)/f_9.$$

Each of the prisms 6a and 6b may comprise a prism that gives $\theta_{9z}$ above as the angle of deflection. These prisms are set at a position at which the central rays of the two illumination beams $L_{i,1}$ and $L_{i,2}$ split in the x-z plane cross the optical axis at the position (second position) of the rear focal point $F_{7y}'$ of the first cylindrical lens 7. Since the convex lens 9 images the linear images $I_{7y+}$, $I_{7y0}$, and $I_{7y-}$ in the entrance pupil 11 of the projection lens 12, as described above, if the central rays of the illumination beams split in the z-direction cross the optical axis at the position $F_{7y}'$, they are never eclipsed by the projection lens 12.

Note that the width, $L_z$, in the z-direction, of each of the linear images $I_{9z+}$ and $I_{9z-}$ formed on the mask 10 is given by:

$$L_z=w*f_9 \qquad (5)$$

where w is the divergence angle of the laser 1, and $f_9$ is the focal length of the convex lens 9. According to experiments, good results were obtained when the width $L_z$ was set to fall within the range:

$$3*L_{z0} \leq L_z \leq 30*L_{z0}. \qquad (6)$$

More specifically, as for the x-z plane, the focal length $f_9$. of the convex lens 9, which satisfies equation (5), can be determined on the basis of the divergence angle w of the laser and a desired width $L_z$ of the illumination region.

As described above, since the size $L_{z0}$, in the z-direction of the linear pattern on the mask 10 is about 0.10 to 0.25 mm, the divergence angle w of the excimer laser is several mrad, and the focal length $f_9$ of the convex lens 9 is several hundred mm, the width $L_z$, in the z-direction, of each of the images $I_{9z}$, and $I_{9z-}$ can be 3 to 10 times of a required size, thus posing no problem upon work.

Note that the linear images $I_{9y-}$, $I_{9y0}$, and $I_{9y+}$ are formed in the entrance pupil 11. Since these images have a rectangular shape as a whole, the dimensions and shape of the entrance pupil 11 are appropriately determined in consideration of the shape of these linear images.

With the above-mentioned arrangement, in this embodiment, the laser beam is linearly imaged on the mask 10 in the z-direction to sufficiently cover the length $L_{z0}$ of each of the two linear mask patterns $P_1$ and $P_2$, as shown in FIG. 5, thus realizing critical illumination. With this illumination, upon projection of the mask patterns onto the workpiece, illumination with very high energy density can be realized. The effect in the x-z plane has been described.

As described above, according to this embodiment, light from the light source is split by amplitude splitting into n ($n \geq 2$) illumination beams $L_{0,1}$ to $L_{0,n}$ by the beam splitting means in the second section including the optical axis. Subsequently, each light beam $L_{0,j}$ (for j=1 to n) is split by the first optical member into m ($m \geq 2$) illumination beams $L_{1,j}$ to $L_{m,j}$ in the first section which includes the optical axis and is perpendicular to the second section, and the illumination beams $L_{1,j}$ to $L_{m,j}$ are directed toward different directions to cross each other at the first position. In the second section, the illumination beams $L_{i,1}$ to $L_{i,n}$ (for i=1 to m) are directed toward different directions by the second optical member to cross each other at the second position. A plurality of illumination beams $L_{1,1}$ to $L_{m,n}$ emerging from the second optical member are caused to overlap each other on the mask in units of the plurality of illumination beams $L_{1,j}$ to $L_{m,j}$ (j=1 to n) by the anamorphic optical system, thereby forming a linear illumination region corresponding to one mask pattern on the mask.

This embodiment realizes, in the y-direction, Köhler illumination that sufficiently covers the length, in the y-direction, of each mask pattern and uniformly illuminates it. Also, this embodiment realizes, in the z-direction, critical illumination that covers the sizes, in the z-direction, of the mask patterns set along the two parallel straight lines within an appropriate range, and images the light beam from the light source within the range. With these illuminations, this embodiment achieves a work apparatus (projection apparatus) which forms two linear illumination regions on the mask 10, has higher energy utilization efficiency than a conventional laser work optical system, and can simultaneously work two workpieces.

In this embodiment, the cylindrical lens 7 is made up of a single cylindrical lens, but may be made up of a plurality of cylindrical lenses, as needed. Also, in this embodiment, the convex lens 9 is made up of a single lens, but may be made up of a plurality of lenses, as needed.

The divergence angle w of the laser is an important factor that determines the illumination width $L_z$ in the z-direction. Hence, a lens and a beam size varying unit for controlling the divergence angle w may be inserted between the light source 1 and the y-direction beam splitting means 4.

Furthermore, in this embodiment, the y-direction beam splitting means 4 is built by the two prisms and splits a light beam into three light beams. However, the number of prisms may be increased as needed to increase the number of split illumination beams.

Moreover, in this embodiment, the z-direction beam splitting means 6 is constituted by the two prisms 6a and 6b to direct the illumination beams $L_{i,1}$ and $L_{i,2}$ in mutually different directions, so that they cross at the second position. When the number of mask patterns is three or more, or when a plurality of mask patterns are aligned in line, the following measures may be taken. That is, the numbers of beam splitters $B_S$ and reflection mirrors M that constitute the beam splitting means may be increased to increase the number of split beams of the beam splitting means, and the number of prisms that make up the z-direction beam splitting means may be increased. Or each of the two illumination beams $L_{i,1}$ and $L_{i,2}$ split by the beam splitting means may be further split into two beams (q=2) in the x-z plane by the z-direction beam splitting means, the number of prisms of which is increased to four, so as to form a plurality of illumination beams $L_{i,1,1}$ to $L_{i,2,2}$.

When the projection apparatus of this embodiment is applied to an orifice plate (nozzle member) and to the manufacture of an ink-jet printer, two orifice plates can be simultaneously worked by single exposure without raising the output of the laser light source to attain high productivity. Accordingly, a low-cost orifice plate and ink-jet printer can be realized.

The above-mentioned embodiment is applied to a work apparatus (projection apparatus) for forming an array of ink ejection orifices on a workpiece. However, the present invention is not limited to orifice formation work. For example, the present invention can also be applied to a case wherein a plurality of linearly distributed device patterns are simultaneously formed on one or a plurality of workpieces to manufacture devices. At that time, since a plurality of devices can be simultaneously worked by single exposure, high productivity can be obtained.

FIGS. 6A and 6B are schematic plan views showing a principal part of the second embodiment of a method of manufacturing a nozzle member and a work apparatus using the method according to the present invention, and FIGS. 7A and 7B are schematic side views showing a principal part of the second embodiment.

This embodiment is substantially the same as the first embodiment, except for the layout order of the z-direction beam splitting means (second optical member) and the first cylindrical lens, the arrangement of the z-direction beam splitting means, and the like. Different portions will be preponderantly explained below. Note that the same reference numerals in this embodiment denote the same parts as in the first embodiment.

A first cylindrical lens (anamorphic lens) 7 determines the illumination region, in the longitudinal direction (y-direction), of a mask 10, and has the same effect as in the first embodiment. A z-direction beam splitting means (second optical member) 61 is made up of a cylindrical lens array obtained by stacking two cylindrical lenses each having a generator parallel to the y-axis.

An object to be worked (workpiece) 16 of this embodiment is a single plate member to be worked to become an orifice plate (nozzle member) of an ink-jet printer.

Figure 9:
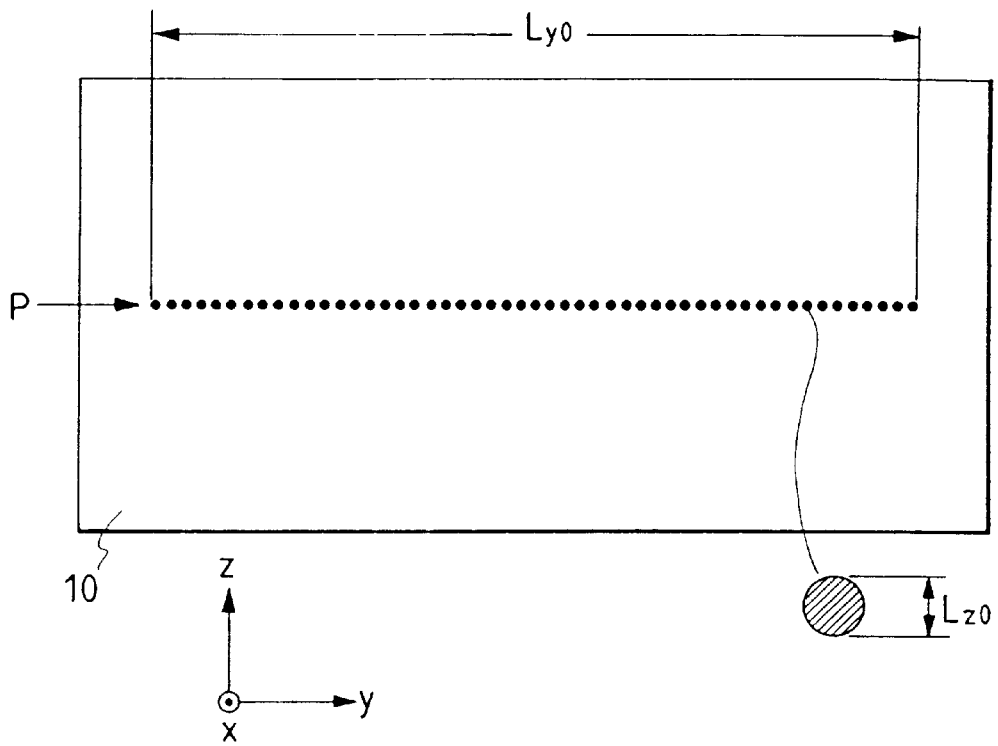
FIG. 9 is a front view of a mask of the second embodiment.

A pattern on the mask 10 of this embodiment has a single mask pattern P consisting of a small hole array formed within a range ($L_{y0} \times L_{z0}$) which is long in the first direction and is narrow in the second direction, as shown in FIG. 9. The mask 10 is set so that the center of the mask pattern P matches the optical axis.

The effect of this embodiment will be explained below. The effect until a laser beam emitted by a light source 1 passes through the aperture of a light-shielding mask 5 is the same as that in the first embodiment. The light beam emerging from the light-shielding mask enters the first cylindrical lens 7 as three illumination beams $L_{1,j}$, $L_{2,j}$, and $L_{3,j}$ having different directions in the x-y plane, and as two parallel light beams $L_{i,1}$ and $L_{i,2}$ in the x-z plane. The effects in the x-y and x-z planes will be described in turn below.

Figure 8A:
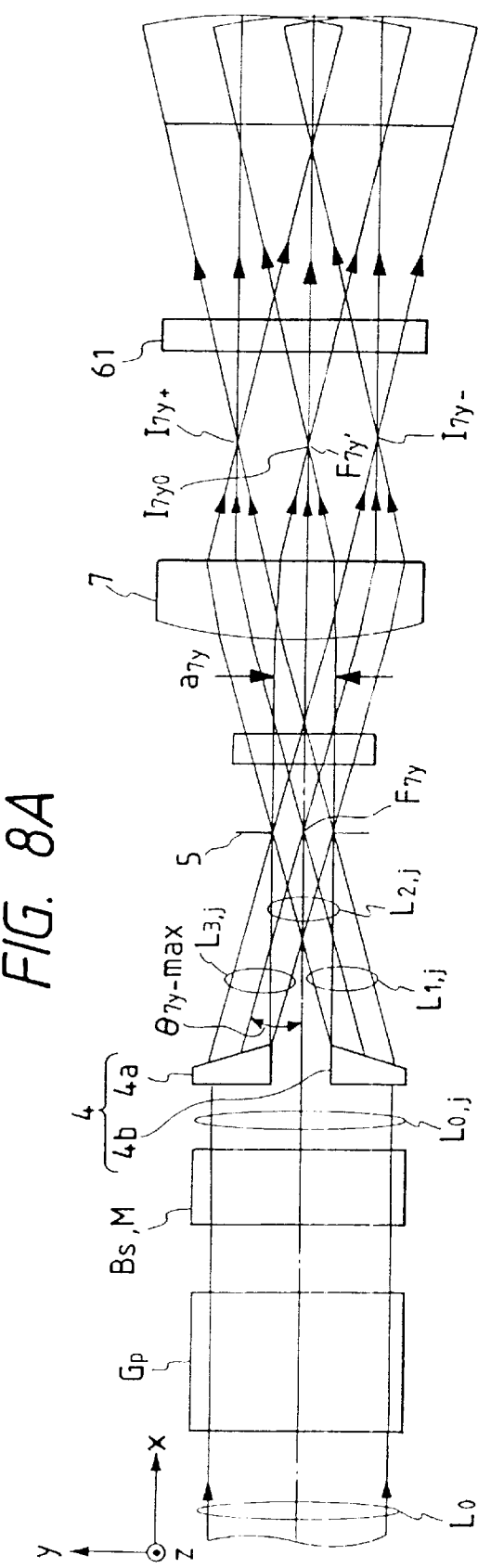
FIGS. 8A and 8B are views showing the individual members from a parallel-plate glass to a z-direction beam splitting means 61 in detail.

The effect in the x-y plane (first section) will be explained below with reference to FIGS. 6A and 6B and FIG. 8A. The central rays of the three illumination beams $L_{1,j}$, $L_{2,j}$, and $L_{3,j}$ cross at the position of the light-shielding mask 5. The light-shielding mask 5 is located at the position of a front focal point $F_{7y}$ of the first cylindrical lens 7. Hence, the central rays of the three illumination beams leave the first cylindrical lens 7 in a direction parallel to the optical axis. That is, the mask 5 and the first cylindrical lens 7 form a so-called telecentric optical system.

After the three illumination beams $L_{1,j}$, $L_{2,j}$ and $L_{3,j}$ are transmitted through the first cylindrical lens 7, they are brought into a focus at a rear-side focal point position $F_{7y}'$ (second position, first focal plane) on the image field side of the lens 7, thus forming three images (intermediate images in the x-y plane) $I_{7y+}$, $I_{7y0}$, and $I_{7y-}$. Note that these images are linear images parallel to the z-axis in practice since the light beams diverge in the x-z plane.

Subsequently, the three illumination beams are transmitted through the z-direction beam splitting means 61. In the x-y plane, the three illumination beams undergo only the optical effect of the z-direction beam splitting means as the parallel plate (However, in practice, the two illumination beams $L_{i,1}$ and $L_{i,2}$ are converted into converging light beams in the x-z plane, as will be described later.)

Figure 10:
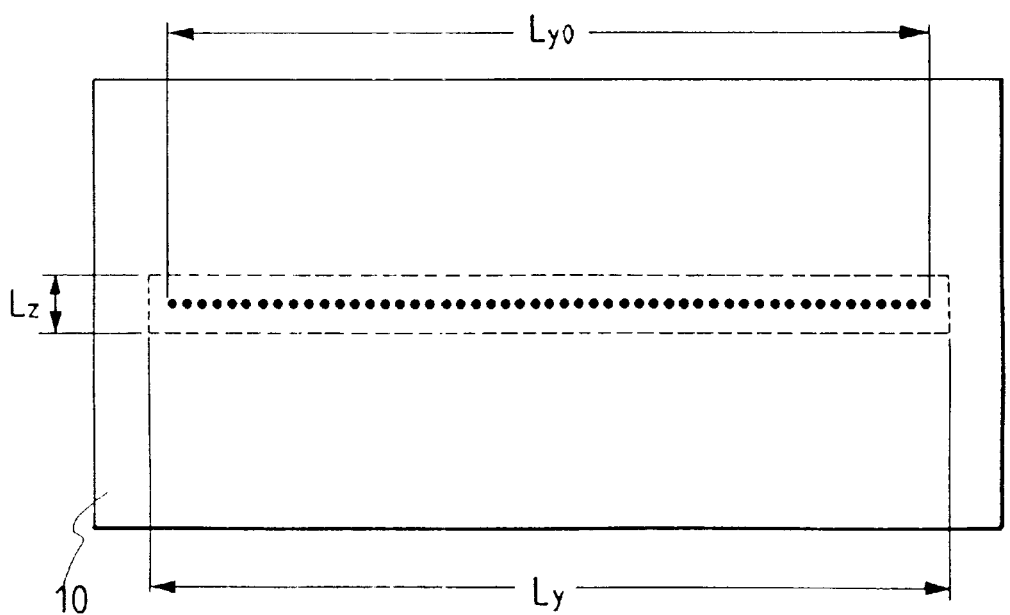
FIG. 10 is an explanatory view of the illumination range of a mask pattern of the second embodiment.

A convex lens (focusing optical system) 9 then re-images the three linear images $I_{7y+}$, $I_{7y0}$, and $I_{7y-}$ on an entrance pupil plane 11 of a projection lens 12 as images $I_{9y+}$, $I_{9y0}$, and $I_{9y-}$. At this time, at the position of the mask 10, since that position corresponds to a rear focal point $F_9'$ of a convex lens 9, all the three illumination beams overlap each other in the x-y plane but are defocused. Note that $L_y$ represents the length (the length of the illumination region) at the overlapping position. The length $L_y$ is assured to sufficiently cover the length $L_{y0}$, in the y-direction, of the mask pattern P, as shown in FIG. 10.

The projection lens 12 re-images the mask pattern on the mask 10 on the workpiece 16. In this case, if the entrance pupil 11 is set at the position of the front focal point of the projection lens 12, the principal rays of the illumination beams exit the projection lens 12 in a direction parallel to the optical axis.

With this arrangement, in this embodiment, the light beam from the laser light source is split into the three illumination beams $L_{1,j}$, $L_{2,j}$ and $L_{3,j}$ in the x-y plane, and these three illumination beams are brought into a focus to form the linear images $I_{7y+}$, $I_{7y0}$, and $I_{7y-}$. Subsequently, these three images $I_{7y+}$, $I_{7y0}$, and $I_{7y-}$ are re-imaged in the entrance pupil 11 of the projection lens 12 as the images $I_{9y+}$, $I_{9y0}$, and $I_{9y-}$. In addition, Köhler illumination is realized to uniformly illuminate the entire mask 10 in the y-direction.

Figure 8B:
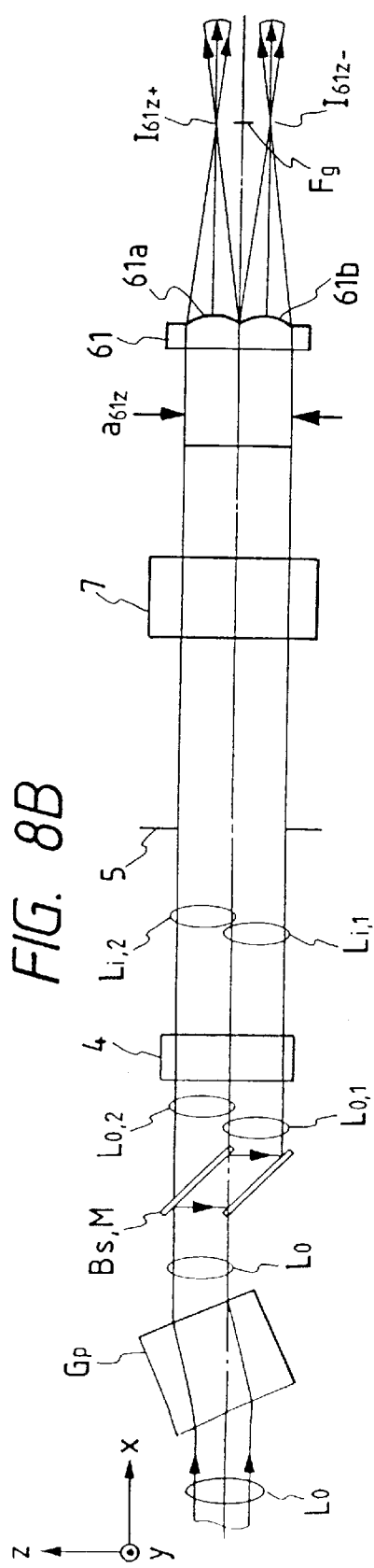

The effect in the x-z plane (second section) will be described below with reference to FIGS. 7A and 7B and FIG. 8B. As shown in FIG. 8B, nearly parallel two light beams $L_{0,1}$ and $L_{0,2}$ formed by a beam splitter $B_S$ and a reflection mirror M pass through a y-direction beam splitting means 4 to become light beams $L_{i,1}$ and $L_{i,2}$ (for i=1, 2, 3). These light beams pass through the light-shielding mask 5 and enter the first cylindrical lens 7. These two illumination beams $L_{i,1}$ and $L_{i,2}$ undergo neither the convergence nor the divergence effects in the z-direction by the first cylindrical lens 7.

Subsequently, the light beams are incident on the z-direction beam splitting means 61. As shown in FIG. 8B, the z-direction beam splitting means 61 comprises a cylindrical lens array built by stacking two cylindrical lenses each having a generator parallel to the y-axis in the z-direction, and images the incident illumination beams $L_{i,1}$ and $L_{i,2}$ at a front focal point position $F_9$ of the convex lens 9.

At this time, when $L_{z0}$ represents the width, in the z-direction, of the mask pattern P, $f_9$ represents the focal length of the convex lens 9, $f_{61z}$ represents the focal length of each cylindrical lens that constitutes the z-direction beam splitting means 61, u represents the number of split light beams in the z-direction, and $a_{61z}$ represents the size of the light beam that enters the z-direction beam splitting means 61, these data are set to satisfy the following relation:

$$L_{z0} \le \frac{f_9}{f_{61z}} * \frac{a_{61z}}{u} = L_z. \tag{7}$$

That is, if $L_{z0}$, $a_{61z}$, u, and $f_9$ are given, the focal length $f_{61z}$, of the cylindrical lens can be determined.

If conditional formula (7) holds, the light beams split by the z-direction beam splitting means 61 exit the convex lens 9 as collimated light beams tilted with respect to the optical axis, and overlap each other on the mask 10. With this effect, the intensity distribution of the illumination region, in the z-direction, of the mask 10 is flattened.

Thereafter, the light beams coming from the mask reach the workpiece 16 via the entrance pupil 11 of the projection lens, and the projection lens 12 to optically work the workpiece 16.

In order to allow the illumination beams to pass through the mask 10 and to enter the projection lens 12 without being eclipsed by the entrance pupil 11, light beams emerging from the projection lens 9 have some limitations. Such limitations will be examined below. Assume that the z-direction beam splitting means 61 consists of u cylindrical lenses. The distance, d, from the optical axis to an outermost cylindrical lens 61u in the x-z plane is:

$$d = \frac{a_{61z}}{2} - \frac{a_{61z}}{2u} = \left(\frac{1}{2} - \frac{1}{2u}\right) a_{61z}.$$

A light ray that passes through this center proceeds forward in a direction parallel to the optical axis up to the convex lens 9, and passes the rear focal point $f_9'$ of the lens 9 after traversing the convex lens 9. For this reason, if s represents the distance from the mask 10 to the entrance pupil 11, the height δ of that light ray upon passing through the entrance pupil 11 is:

$$\delta = s * \left(\frac{1}{2} - \frac{1}{2u}\right) * \frac{a_{61z}}{f_9}.$$

Hence, the height $h_{11z}$ of a light ray that passes through the outermost position of the entrance pupil 11 assumes the sum of δ and $L_{z0}/2$. If $Al_1$ represents the diameter of the entrance pupil 11, this height $h_{11z}$ must satisfy:

$$h_{11z} = \frac{L_{z0}}{2} + s * \left(\frac{1}{2} - \frac{1}{2u}\right) * \frac{a_{61z}}{f_9} \le \frac{A_{11}}{2}. \tag{8}$$

Accordingly, formulas (7) and (8) yield the following relation:

$$f_{61z} \ge s * \frac{(u-1)}{u^2} * \frac{(a_{61z})^2}{L_{z0} * (A_{11} - L_{z0})}. \tag{9}$$

That is, the focal length $f_{61z}$ of each cylindrical lens that constitutes the z-direction beam splitting means 61, and the number u of split beams need only be determined to satisfy formulas (7) and (8).

With the above arrangement, this embodiment realizes, in the y-direction, Köhler illumination that illuminates the mask with uniform brightness to sufficiently cover the length $L_{y0}$, in the y-direction, of the mask pattern P, and also realizes, in the z-direction, illumination with a flat intensity distribution by superposing a plurality of light beams on the mask 10.

In the above-mentioned effect in the x-z plane, the method of adjusting a parallel-plate glass $G_P$, the beam splitter $B_S$, and the reflection mirror M as the feature of the present invention will be described below.

Before exposure of the workpiece, this portion is adjusted. First, the position of the parallel-plate glass $G_P$ is adjusted while observing the beam incident position at the z-direction beam splitting means 61. That is, the parallel-plate glass $G_P$ is rotated to shift a laser beam $L_0$ in the z-direction, so that all the light components of the light beam $L_{0,2}$, which is transmitted through the beam splitter $B_S$, enter and are refracted by a cylindrical lens 61a, but do not enter a cylindrical lens 61b at all.

Subsequently, the tilt angle and the position, in the z-direction, of the reflection mirror M are adjusted to make the light beam $L_{0,1}$ reflected by the beam splitter $B_S$ parallel to the transmitted light beam $L_{0,2}$, so that all the light components of the light beam $L_{0,1}$ enter and are refracted by the cylindrical lens 61b, but do not enter the cylindrical lens 61a at all.

In this manner, adjustment is made so that the transmitted light beam $L_{0,2}$ and the reflected light beam $L_{0,1}$ from the beam splitter $B_S$ respectively enter the cylindrical lenses 61a and 61b of the z-direction beam splitting means 61 to have a one-to-one correspondence therebetween. Since light beams that enter the cylindrical lenses are always parallel to the optical axis, light rays emerging from the centers of the cylindrical lenses are parallel to the optical axis.

Note that the two light beams do not have equal intensities as in the above embodiment. In such cases, an attenuation filter or the like is inserted into the optical path of the light beam having a higher intensity to adjust the intensities, so that the two light beams have equal intensities.

In this manner, the adjustment of the parallel-plate glass $G_P$, the beam splitter $B_S$ as an amplitude splitter, and the reflection mirror M is completed, and work of the workpiece 16 is started.

As described above, the parallel-plate glass $G_P$, the beam splitter $B_S$, and the reflection mirror M have a function of amplitude-splitting the light beam from the light source to expand the split beams doubly in the z-direction, and a function of making adjustment so that light beams appropriately enter the z-direction beam splitting means 61.

Note that the z-direction beam splitting means 61 of this embodiment is set on a stage (not shown) movable in the y-direction. This stage comprises an optical filter (flat optical filter) 17 which is inserted into the optical path instead when the z-direction beam splitting means 61 is retreated from the optical path. With this arrangement, in this embodiment, when the z-direction beam splitting means 61 is inserted in the optical path, the illumination region uniformly illuminates the mask 10 in the z-direction as well, and when the optical filter 17 is inserted in the optical path, an illumination region that linearly critical-illuminates the mask 10 in the z-direction is formed. (In some cases, the z-direction beam splitting means 61 alone may be retreated or inserted from or into the optical path.)

In this embodiment, with the above arrangement, the intensity distribution of the illumination region on the mask is flattened well in both the longitudinal and widthwise directions of the mask, and is hardly influenced by nonuniformity of illumination light, thus improving work precision.

Note that the illumination method in the x-z plane in this embodiment resembles Köhler illumination, but has an effect that cannot be obtained by the Köhler illumination. More specifically, if the light beams $L_{i,1}$ and $L_{i,2}$ that enter the z-direction beam splitting means 61 are imaged together at the position of the rear focal point $F_{7y}'$ in the x-z plane, the mask 10 is Köhler-illuminated in the x-z plane as well.

However, since the size $L_{z0}$, in the z-direction, of each small hole on the mask 10 is as very small as 0.1 to 0.25 mm, as described above, the NA of the light beam that passes through the mask pattern P and enters the projection lens 12 in the x-z plane also becomes very small. That is, even when the diameter $a_{61z}$ of the incident light beam and the convex lens 9 are large, the energy utilization efficiency is very poor.

In the present invention, the width $a_{61z}/u$ of each cylindrical lens that constitutes the z-direction beam splitting means is set so that the collimated light beam that comes from the convex lens 9 toward the mask 10 in the x-z plane has a diameter which has a margin with respect to $L_{z0}$ but is not unnecessarily large, i.e., a diameter about 10 times $L_{z0}$. In this connection, the width of the collimated light beam emerging from the convex lens 9 at that time is:

$$\frac{a_{61z}}{u} * \frac{f_9}{f_{61z}}.$$

When the number u of split beams and the focal length $f_{61z}$ of the cylindrical lens are set based on this relation, the mask pattern P can be uniformly illuminated as in Köhler illumination by utilizing all the light beams entering the z-direction beam splitting means 61 in the x-z plane as well.

In this embodiment, since the illumination state can be changed by selecting one of the z-direction beam splitting means 61 and the optical filter 17, appropriate illumination can be attained in correspondence with the shape and size of the mask pattern and, hence, energy loss can be minimized.

In this embodiment, the y-direction beam splitting means 4 is built by two prisms to split a light beam into three light beams. As in the first embodiment, the number of prisms may be increased to increase the number of split illumination beams.

The number of split beams in the z-direction by the z-direction beam splitting means 61 of this embodiment is 2. However, the number of split beams may be changed as long as the above-mentioned conditional formula holds.

Furthermore, the pair of cylindrical lenses that constitute the z-direction beam splitting means 61 may be replaced by zoom lenses, so that the size of the illumination region can be changed by changing the focal length while maintaining constant back focus.

With the above arrangement, a one-dimensional linear mask pattern (a plurality of linear patterns in the first embodiment or a single linear pattern in the second embodiment) can be illuminated with very high energy utilization efficiency, and a light beam from the light source is split by amplitude splitting so that the size in the widthwise direction on the mask surface can be increased by 20 to 30%, thus shortening the adjustment time upon mask adjustment. At the same time, the position of the illumination region on the mask surface varies due to aging of the emitting direction of the excimer laser. However, since the width of the laser beam can be expanded, a work apparatus which is strong against aging of the excimer laser can be achieved.

Since the y- and z-direction beam splitting means which do not use any flyeye lens are used, a work apparatus which can attain high-precision laser work with a simple arrangement can be achieved.

Especially, the first embodiment can achieve a method of manufacturing a nozzle member, which can work two workpieces in, e.g., single work as parts work, can remarkably improve productivity by doubling work performance of the apparatus while suppressing energy loss, and can attain a cost reduction. Since two work light beams are formed by amplitude splitting, a method of manufacturing a nozzle member can be achieved, which is free from any work nonuniformity between two parts due to light amount nonuniformity between the two work light beams that arises from intensity distribution nonuniformity in the wavefronts of the laser beams. When the work apparatus of the present invention is used, a low-cost bubble-jet printer using a low-cost orifice plate can be achieved.

What is claimed is:

1. An ink jet printer comprising:
   a nozzle member manufactured by a method comprising:
      a step of splitting light from a light source by amplitude splitting to form a plurality of illumination beams; and
      a step of illuminating a plurality of mask patterns with corresponding ones of the plurality of illumination beams so as to expose at least one work-piece via the mask patterns.

2. An ink jet printer according to claim 1, wherein each of the plurality of mask patterns has a pattern formed by arranging a plurality of small openings corresponding to nozzle orifices of a nozzle member in a first direction.

3. An ink jet printer according to claim 2, wherein the plurality of illumination beams are focused on a plurality of linear illumination regions extending in the first direction at a position of the mask patterns.

4. An ink jet printer according to claim 3, wherein the plurality of mask patterns are formed parallel to each other along a second direction perpendicular to the first direction.

5. An ink jet printer according to claim 4, wherein the plurality of mask patterns are formed on a common substrate.

6. An ink jet printer according to claim 5, wherein the step of splitting light from the light source includes the step of splitting light from the light source into n (n≧2) illumination beams $L_{o,1}$ to $L_{o,n}$, which are substantially parallel to each other, by amplitude splitting in a second section including an optical axis, splitting each light beam $L_{o,j}$ (for j=1 to n) into m (m≧2) illumination beams $L_{1,j}$ to $L_{m,j}$ and directing the illumination beams $L_{1,j}$ to $L_{m,j}$ in different directions to cross each other at a first position in a first section which includes the optical axis and is perpendicular to the second section, and directing illumination beams $L_{i,1}$ to $L_{i,n}$ (for i=1 to m) that cross each other at the first position in different directions to cross each other at a second position in the second section so as to form a plurality of illumination beams $L_{1,1}$ to $L_{m,n}$, or further splitting each of the illumination beams $L_{i,1}$ to $L_{i,n}$ (for i=1 to m) that cross each other at the first position into q illumination beams $L_{i,j,1}$ to $L_{i,j,q}$ and directing the split illumination beams in different directions to cross each other at the second position so as to form a plurality of illumination beams $L_{1,1,1}$ to $L_{m,n,q}$.

7. An ink jet printer according to claim 6, wherein the light beams that pass through the plurality of mask patterns illuminate mutually different positions on a common workpiece.

8. An ink jet printer according to claim 6, wherein the light beams that pass through the plurality of mask patterns illuminate mutually different workpieces.

9. An ink jet printer according to claim 6, wherein the plurality of illumination beams are directed toward the plurality of mask patterns via a common optical system.

10. An ink jet printer according to claim 6, wherein the illumination beams that pass through the plurality of mask patterns are directed onto the workpiece via a projection optical system to form images of the plurality of mask patterns on the workpiece.

11. An ink jet printer according to claim 1, wherein the light source comprises a laser.

12. An ink jet printer according to claim 11, wherein the light source comprises an excimer laser.

13. An ink jet printer comprising:
   a nozzle member, which is manufactured by a method using a light source, a first optical member for splitting a light beam from said light source in a first section including an optical axis, an anamorphic lens having a refractive power in only the first section, a second optical member for splitting incident light beams in a second section which includes the optical axis and which is perpendicular to the first section, and imaging the split light beams in the second section, a focusing optical system having a front focal point located at an imaging point of said second optical member, a mask which has a mask pattern formed by arranging a plurality of small openings corresponding to nozzle orifices of a nozzle member in a first direction perpendicular to the optical axis in the first section, and is set at a rear focal point of said focusing optical system, and a projection optical system for forming an image of the mask pattern on a workpiece,
   wherein when the light beam from said light source is split into a plurality of light beams via said first and second optical members, a plurality of light beams split in the first section form intermediate images by said anamorphic lens and, thereafter, are imaged in an entrance pupil of said projection optical system via said focusing optical system, a plurality of light beams split in the second section illuminate the mask pattern via said focusing optical system, and said projection optical system forms an image of the mask pattern illuminated with the plurality of light beams on the workpiece,
   the plurality of split light beams overlap each other on said mask in the first and second sections.

14. An ink-jet printer according to claim 13, wherein said second optical member comprises a cylindrical lens array built by arranging a plurality of cylindrical lenses, each of which has a generator in the first direction, in a second direction perpendicular to the optical axis in the second section.

15. An ink-jet printer according to claim 14, wherein a focal length $f_{61z}$ of said cylindrical lens satisfies:

$$f_{61z} \leq \frac{f_9}{L_{z0}} * \frac{a_{61z}}{u}$$

where $L_{z0}$ is the width, in the second direction, of the mask pattern, $f_9$ is the focal length of said focusing optical system, u is the number of beams split by said second optical member, and $a_{61z}$ is the width, in the second direction, of a light beam that enters said second optical member.

16. An ink-jet printer according to claim 15, wherein a diameter $A_{11}$ of the entrance pupil satisfies:

$$\frac{L_{x0}}{2} + s * \left(\frac{1}{2} - \frac{1}{2u}\right) * \frac{a_{61z}}{f_9} < \frac{A_{11}}{2}$$

where s is the-distance from said mask to the entrance pupil of said projection optical system.

17. An ink-jet printer according to claim 13, wherein said second optical member is withdrawn from an optical path or is replaced by another optical element in accordance with at least one of a pattern shape and a pattern size of the mask pattern.

18. An ink-jet printer according to claim 13, wherein light from said light source is split into n (n≧2) illumination beams $L_0,1$ to $L_{0,n}$, which are substantially parallel to each other, by amplitude splitting by beam splitting means in the second section, each light beam $L_{0,j}$ (for j=1 to n) is split into m (m≧2) illumination beams $L_{1,j}$ to $L_{m,j}$ and the illumination beams $L_{1,j}$ to $L_{m,j}$ are directed in different directions to cross each other at a first position by said first optical member in the first section, the illumination beams $L_{1,j}$ to $L_{m,j}$ enter said anamorphic lens, and said second optical member splits the illumination beams into u light beams in units of illumination beams $L_{i,1}$ to $L_{i,n}$ (for i=1 to m) in the second section.

19. An ink-jet printer according to claim 18, wherein the beam splitting means comprises a beam splitter and a reflection mirror.

20. An ink-jet printer according to claim 18, wherein said method further uses beam adjustment means, inserted between said light source and the beam splitting means, for adjusting a position of light from said light source in the second section.

21. An ink-let printer according to claim 13, wherein said light source comprises an excimer laser.

* * * * *

UNITED STATES PATENT AND TRADEMARK OFFICE
CERTIFICATE OF CORRECTION

PATENT NO.     : 6,239,914 B1
DATED          : May 29, 2001
INVENTOR(S)    : Masayuki Nishiwaki It is certified that error appears in the above-identified patent and that said Letters Patent is hereby corrected as shown below:

Column 2,
Line 13, "each," should read -- each --; and
Line 15, "Laws to" should be deleted.

Column 3,
Line 31, "on" should read -- an --.

Column 5,
Line 23, "system"1)" should read -- system") --.

Column 13,
Line 21, "plate" should read -- plate. --; and
Line 46, "$I^{7yo}$," should read -- $I_{7y0}$, --.

Column 17,
Line 26, "work-piece" should read -- workpiece --.

Column 19,
Line 5, "the-distance" should read -- the distance--; and
Line 14, "$L_0,1$" should read -- $L_{0,1}$ --.

Column 20,
Line 11, "method" should read -- printer --.

Signed and Sealed this

Twenty-sixth Day of February, 2002

Attest:

JAMES E. ROGAN
Attesting Officer     Director of the United States Patent and Trademark Office